Oct. 14, 1952     A. M. TONNELÉ     2,613,889
AUTOMATIC DEVICE FOR LANDING AIRCRAFT
Filed Nov. 7, 1947     2 SHEETS—SHEET 1
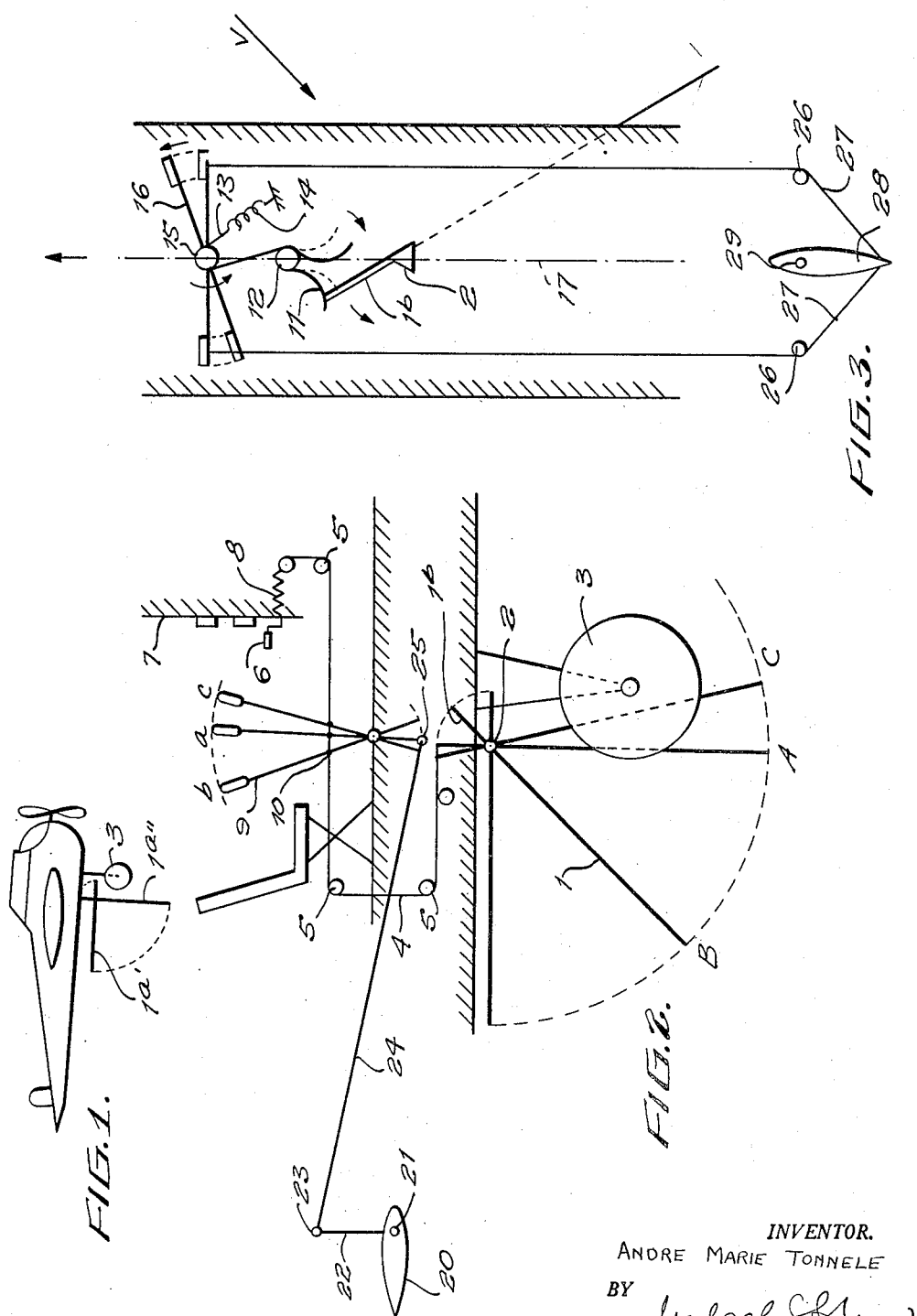
INVENTOR.
ANDRE MARIE TONNELE Oct. 14, 1952        A. M. TONNELÉ        2,613,889

AUTOMATIC DEVICE FOR LANDING AIRCRAFT

Filed Nov. 7, 1947        2 SHEETS—SHEET 2

INVENTOR.
ANDRE MARIE TONNELÉ
BY

Patented Oct. 14, 1952

2,613,889

UNITED STATES PATENT OFFICE 2,613,889

AUTOMATIC DEVICE FOR LANDING AIRCRAFT

André Marie Tonnelé, Fez, Morocco

Application November 7, 1947, Serial No. 784,608
In Morocco June 23, 1947

11 Claims. (Cl. 244—81)

My invention relates to an automatic safety arrangement for the landing or alighting of seaplanes. Said arrangement is designed in a manner such that the pilot may ascertain the speed of the aircraft at the moment of landing or alighting together with his distance from the ground or water level as he approaches same and also the direction to be assumed so as to land in opposition to the direction of the wind.

The apparatus is chiefly characterized by the fact that it includes a rod pivotally secured at a suitable point of its length to a ball and socket joint arranged under the fuselage of the craft preferably on the medial axis of the landing gear, said rod being held during normal flight horizontally in a direction parallel to the direction of progress of the craft with its longer section directed rearwardly. The front end of the rod is connected through a cable guided over a suitable system of pulleys, with a control member located within reach of the pilot's hand, for instance on the instrument board of the craft. This allows the pilot to place the rod vertically before landing or alighting, the longer section of the rod then being directed downwardly while the smaller section enters the aircraft.

The cable controlling the rod is associated with a tensioning system the tension of which is calculated so as to balance the stress exerted on the rod by the resistance of air when the craft moves at a safe speed allowing landing or alighting, said balancing being obtained when the outer section of the rod is derected towards the ground in a position that is substantially perpendicular to the path followed by the craft.

The cable controlling the rod includes attaching means for securing it to the joystick or the like member controlling the elevators of the craft, such member being thus connected kinematically with the inner end of the rod whereby the positions occupied by the latter in a vertical longitudinal plane under the action of aerodynamic forces or of the contact with the ground or water level defines positions of the joystick that correspond to the operation required by the circumstances that have brought the rod into the position considered.

On the other hand, the inner end of the rod is capable of acting through the agency of a suitable reversing gear on the axis of the rudder bar when the rod is shifted to either side of a vertical plane passing through the longitudinal axis of the craft, which is the case when the rod has come into contact with the ground or water level and the craft is laterally shifted by reason of the action of a gust of wind blowing in a direction that is oblique with reference to the path of the craft; thus any lateral shifting of the rod under such conditions produces a modification in the position of the rudder bar that corresponds to the operation required for setting the craft in the direction facing the wind.

The transmission means between the rod and the control means for the craft should be sufficiently yielding so as to allow the pilot to resist the stresses produced by the rod.

Accompanying drawings, given out solely by way of examples and being by no means limiting, illustrate a practically possible form of execution of the invention. In said drawings:

Fig. 1 is a diagrammatic view of an aircraft provided with an arrangement according to the invention and showing two positions of the rod, respectively for normal flight and for landing purposes.

Fig. 2 is a diagram illustrating an example of a transmission gear between the movements of said rod in the longitudinal vertical plane of the machine and the joystick of the craft.

Fig. 3 is a diagram illustrating an example of a transmission gear for the lateral displacements of the rod to be transmitted to the axis of the rudder bar.

Figure 5:
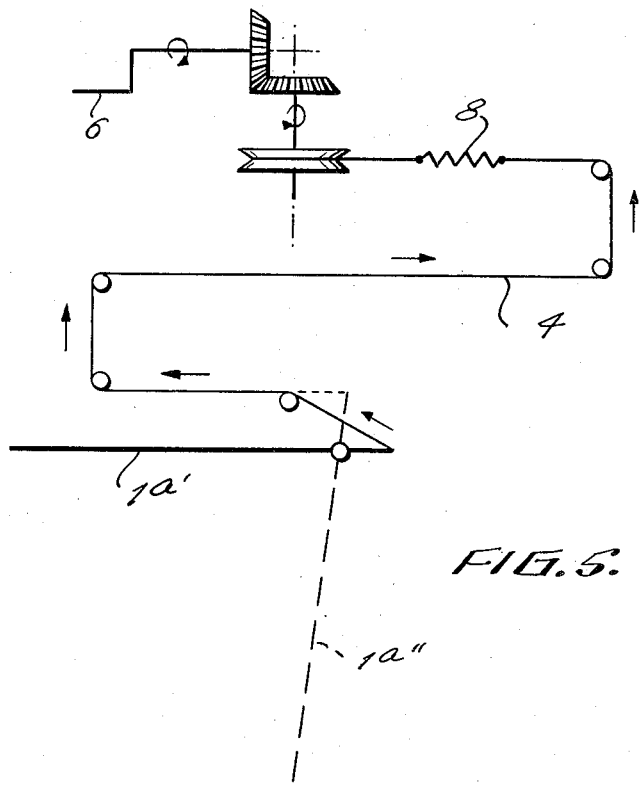
Figure 4:
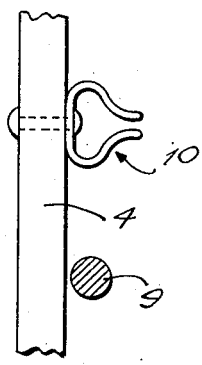

Figs. 4 and 5 respectively show, on an enlarged scale, details of the structure of Fig. 2.

In Fig. 2, the rod 1 is shown underneath the body of the craft and it is pivotally secured to a ball and socket joint 2 located on the axis of the landing gear 3.

The longer section 1a of the rod 1 is directed during normal flight towards the rear of the craft, in a horizontal position as shown at 1a' (Fig. 1). Its length is such that when it is directed towards the ground in the position 1a'' as shown in Fig. 1, its lower end drops lower than the lower plane of the landing gear 3. The shorter section 1b of the rod 1 (Fig. 2) extends to the inside of the fuselage and is connected therein to a cable 4 passing over pulleys 5 and connecting the rod to a crank 6 carried on the instrument board 7. As is shown in Fig. 5, the crank 6 turns, through a pair of bevel gears, a pulley on which an end of the cable 4 is wound, the tensioning means 8 being inserted in the length of the cable 4, as illustrated.

Through operation of the crank 6, the pilot may, before he lands, bring the end 1a of the rod 1 from the position 1a' into the position 1a''. This operation produces the tensioning of the tensioning means 8 associated with the cable 4.

The tensioning means 8 is designed so as to balance the thrust of air on the section 1a of the rod 1 when the latter is in its position 1a'' and the craft moves at the safety speed allowing its landing.

As is diagrammatically illustrated in Fig. 2, an elevator 20 is turnable about axis 21 and is fixedly connected to a bar 22 which is pivotally linked at 23 to a rigid rod 24 which is itself pivotally linked at 25 to the lower end of joystick 9 so that the elevator 20 will be controlled in accordance with the manipulation of the joystick 9.

The joystick 9 of the craft may be controlled by the cable 4 through the agency of attaching means 10. The attaching means 10 is located on the cable 4 to one side of the joystick 9 when rod 1 is in position 1a' and moves to a position opposite to the joystick 9 when rod 1 is in position 1a". As is shown in Fig. 4, the attaching means 10 takes the form of a spring clip riveted to the cable 4. The operation of this arrangement is as follows:

When the craft is thus on the point of landing and it has come sufficiently near ground, the pilot acts as disclosed on the crank 6 in order to bring the end 1a of the rod 1 from the position 1a' to the position 1a" after which he secures the joystick 9 to the attaching means 10. The joystick is thus connected kinematically through the cable 4 to the end 1b of the rod 1.

If the speed of the craft is now equal to the safe speed for landing, the action of air on the rod is counteracted by the tensioning means 8 and, as the cable 4 remains stationary, there is no action exerted on the joystick that remains in the position $a$ corresponding to the vertical position A of the rod 1 (Fig. 2) until the rod 1 comes into contact with ground. Said rod slopes then gradually towards the rear and its angular movement produces then a corresponding rearward movement of the joystick so as to produce thus automatically the elevator control required for landing purposes.

If the speed of the craft when nearing ground is higher than safe speed foreseen for landing, the action of air pressure on the rod is greater than that of the tensioning means 8. The rod is urged rearwardly for instance into the position B which results in bringing the joystick into the corresponding position $b$ that controls the rise of the craft.

Lastly, if the speed of the craft is less than safety speed when nearing ground the action of the tensioning means 8 predominates over the thrust of air on the rod and draws the latter forwardly for instance into the position C. To said position of the rod corresponds the position $c$ of the joystick at which the downward movement of the craft is accelerated. This acceleration lasts until the rod meets the ground and is returned into the position A so as to allow landing.

Through this arrangement, the pilot is informed as to the speed of his craft and its distance from ground at the moment of landing and the operations required by the circumstances are executed or at least initiated automatically.

The end 1b of the rod 1 is fitted between the two arms of a fork 11 (Fig. 3) secured to the axis of a pulley 12. A cable 13 is secured at one end to the pulley 12 and at its other end to a tensioning device 14. Said cable 13 is wound in succession round the pulley 12 and round the axis 15 of the rudder bar 16. As is diagrammatically illustrated in Fig. 3, the wires 27 extend from the rudder bar 16 about the guide pulleys 27 and are connected to the rudder 28 which is turnable about axis 29 in accordance with the movement of the rudder bar 16.

This arrangement has for its object to set the apparatus against the wind when the landing takes place in a direction that is oblique with reference to that of said wind.

Its operation is as follows:

The craft is supposed to land in the direction of its longitudinal axis 17 (Fig. 3), the direction of the wind being that illustrated by the arrow V. This shifts the craft to the left. When the lower end of the rod 1 comes into contact with the ground it is therefore deflected towards the right and the upper end 1b of said rod causes the fork 11 to pivot towards the left. The pulley 12 rotates consequently towards the left and causes the axis 15 of the rudder bar to pivot towards the right; the right hand pedal on said rudder bar is thus thrust forward which causes the craft to turn clockwise whereby the machine has a tendency to be set in a direction facing the wind. As soon as the craft lies exactly facing the wind, the rod lies again in the heading direction and its action on the rudder bar ceases.

Such a device automatically restores the craft into its proper setting with reference to the wind.

The transmission means between the rod on one hand and the joystick and rudder bar on the other may be yielding in order to allow the pilot to oppose, if required, any stresses transmitted by the rod or to compensate them if necessary. The rod may in its turn be constituted so as to have a certain amount of yieldability.

The above described arrangements are designed so as to be mounted on an aircraft but it is apparent that they may as well be adapted for use, with very little modifications, on a seaplane or amphibian machine.

My invention is obviously not limited to the example of execution that has been described and illustrated.

It is possible to resort if required to other forms of execution without widening the scope of my invention as defined in appended claims.

It is also possible according to circumstances and to practical requirements to vary the details of construction and assembling.

On the other hand, the various parts or arrangements described or illustrated by way of mere examples may be replaced by others playing the same part or producing the same result.

What I claim is:

1. In an airplane, automatic operating means for operating the rudders during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; and rudder operating means operatively connected with said actuating portion of said elongated operating member in such a manner as to be actuated by movement of the same out of the vertical plane passing through the longitudinal axis of said airplane and proportionately to such movement.

2. In an airplane, actuating operating means for operating the rudders during landing comprising in combination universal pivoting means secured to the body of said airplane; an elongated operating member having a trailing bottom end and being held freely turnable by said universal pivoting means at a point intermediate its ends so as to have a normally upwardly projecting actuating portion and a portion normally projecting downward beyond the horizontal plane tangent to the lowermost portion of the wheels of the airplane; and rudder operating means operatively connected with said upwardly projecting actuating portion of said operating member in such a manner as to be actuated by movement of the same out of the vertical plane passing through the longitudinal axis of said airplane and proportionately to such movement.

3. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; and elevator operating means operatively connected with said actuating portion of said operating member in such a manner as to be actuated by movement of the same out of the vertical plane passing through said universal pivoting means and perpendicularly across the longitudinal axis of said airplane and proportionately to such movement.

4. In an airplane, actuating operating means for operating the rudders and elevators during landing comprising in combination universal pivoting means secured to the body of said airplane; an elongated operating member having a trailing bottom end and being held freely turnable by said universal pivoting means at a point intermediate its ends so as to have a normally upwardly projecting actuating portion and a portion normally projecting downward beyond the horizontal plane tangent to the lowermost portion of the wheels of the airplane; rudder operating means operatively connected with said upwardly projecting actuating portion of said operating member in such a manner as to be actuated by movement of the same out of the vertical plane passing through the longitudinal axis of said airplane and proportionately to such movement; and elevator operating means operatively connected with said upwardly projecting actuating portion of said operating member in such a manner as to be actuated by movement of the same out of the vertical plane passing through said universal pivoting means and perpendicularly across the longitudinal axis of said airplane and proportionately to such axial movement.

5. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; operating means operatively connected with said actuating portion of said operating member in such a manner as to be actuated by movement of the same out of the vertical plane passing through said universal pivoting means and perpendicularly across the longitudinal axis of said airplane and proportionately to such movement; and resilient means urging said operating member into a substantially straight vertical position, the said resilient means having a force sufficient to overcome the air resistance at a predetermined speed of said airplane.

6. In an airplane, actuating operating means for operating the rudders and elevators during landing comprising in combination universal pivoting means secured to the body of said airplane; an elongated operating member having a trailing bottom end and being held freely turnable by said universal pivoting means at a point intermediate its ends so as to have a normally upwardly projecting actuating portion and a portion normally projecting downward beyond the horizontal plane tangent to the lowermost portion of the wheels of the airplane; rudder operating means operatively connected with said upwardly projecting actuating portion of said operating member in such a manner as to be actuated by movement of the same out of the vertical plane passing through the longitudinal axis of said airplane and proportionately to such movement; elevator operating means operatively connected with said upwardly projecting actuating portion of said operating member in such a manner as to be actuated by movement of the same out of the vertical plane passing through said universal pivoting means and perpendicularly across the longitudinal axis of said airplane and proportionately to such axial movement; and resilient means urging said operating member into a substantially straight vertical position, the said resilient means having a force sufficient to overcome the air resistance at a predetermined speed of said airplane.

7. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; elevator operating means operatively connected with said actuating portion of said operating member in such a manner as to be actuated by movement of the same out of the vertical plane passing through said universal pivoting means and perpendicularly across the longitudinal axis of said airplane and proportionately to such movement; and means for swinging said operating member at will so as to retract and project the same.

8. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; elevator operating means operatively connected with said actuating portion of said operating member in such a manner as to be actuated by movement of the same out of the vertical plane passing through said universal pivoting means and perpendicularly across the longitudinal axis of said airplane and proportionately to such movement; resilient means urging said operating member into a substantially straight vertical position, the said resilient means having a force sufficient to overcome the air resistance at a predetermined speed of said airplane; and means for swinging said operating member at will so as to retract and project the same.

9. In an airplane, actuating operating means for operating the rudders and elevators during landing comprising in combination universal pivoting means secured to the body of said airplane; an elongated operating member having a trailing bottom end and being held freely turnable by said universal pivoting means at a point intermediate its ends so as to have a normally upwardly projecting actuating portion and a portion normally projecting downward beyond the horizontal plane tangent to the lowermost portion of the wheels of the airplane; rudder operating means operatively connected with said upwardly projecting actuating portion of said operating member in such a manner as to be actuated by movement of the same out of the vertical plane passing through the longitudinal axis of said airplane and proportionately to such movement; elevator operating means operatively connected with said upwardly projecting actuating portion of said operating member in such a manner as to be actuated by movement of the same out of the vertical plane passing through said universal pivoting means and perpendicularly across the longitudinal axis of said airplane and proportionately to such movement; resilient means urging said operating member into a substantially straight vertical position, the said resilient means having a force sufficient to overcome the air resistance at a predetermined speed of said airplane; and means for swinging said operating member at will so as to retract and project the same.

10. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; elevator operating means operatively connected with said actuating portion of said operating member in such a manner as to be actuated by movement of the same out of the vertical plane passing through said universal pivoting means and perpendicularly across the longitudinal axis of said airplane and proportionately to such movement; a manually operated actuator; and a mechanical connection between said actuator and said operative connection of said elevator operating means and actuating portion whereby the elevators may manually be actuated so as to retract and project at will said operating member.

11. In an airplane, automatic operating means for operating the rudders and elevators during landing comprising in combination universal pivoting means secured to the body of said airplane; an elongated operating member having a trailing bottom end and being held freely turnable by said universal pivoting means and normally extending in operative position vertically downward beyond the horizontal plane tangent to the lowermost portion of the wheels of said airplane and having an actuating portion spaced from said trailing bottom end of said operating member; rudder operating means operatively connected with said actuating portion of said elongated operating member in such a manner as to be actuated by movement of the same out of the vertical plane passing through the longitudinal axis of said airplane and proportionately to such movement; elevator operating means operatively connected with said actuating portion of said operating member in such a manner as to be actuated by movement of the same out of the vertical plane passing through said universal pivoting means and perpendicularly across the longitudinal axis of said airplane and proportionately to such movement; a manually operated actuator; a mechanical connection between said actuator and said operative connection of said elevator operating means and actuating portion whereby the elevators may manually be actuated so as to retract and project at will said operating member; and resilient means forming part of said mechanical connection urging said operating member into a substantially straight vertical position, the said resilient means having a force sufficient to overcome the air resistance at a predetermined speed of said airplane.

ANDRÉ MARIE TONNELÉ.

REFERENCES CITED

The following references are of record in the file of this patent:

UNITED STATES PATENTS

| Number | Name | Date |
|---|---|---|
| 1,779,168 | Isom | Oct. 21, 1930 |
| 1,908,408 | Cox | May 9, 1933 |